United States Patent [19]

Mizokami

[11] 4,317,621
[45] Mar. 2, 1982

[54] EXPOSURE CONTROL APPARATUS FOR USE WITH A CAMERA HAVING ELECTRONIC FLASH CONTROLLING CAPABILITY

[75] Inventor: Kazunori Mizokami, Hachioji, Japan

[73] Assignee: Olympus Optical Co., Ltd., Japan

[21] Appl. No.: 126,662

[22] Filed: Mar. 3, 1980

[30] Foreign Application Priority Data

Apr. 20, 1979 [JP] Japan .................................. 54/48695

[51] Int. Cl.³ ............................................. G03B 15/05
[52] U.S. Cl. ........................................ 354/33; 354/34; 354/145
[58] Field of Search ........................ 354/33, 34, 32, 27, 354/60 F, 137–139, 149, 133, 51, 50, 145

[56] References Cited

U.S. PATENT DOCUMENTS 4,194,818  3/1980  Matteson et al. ................. 354/34 X

FOREIGN PATENT DOCUMENTS 51-160023 12/1976 Japan .

Primary Examiner—L. T. Hix
Assistant Examiner—W. J. Brady
Attorney, Agent, or Firm—Ostrolenk, Faber, Gerb & Soffen

[57] ABSTRACT

An exposure control apparatus for use with a camera having electronic flash controlling capability and including a photometric circuit activated by a trigger switch which is operated in response to a shutter release operation is disclosed. The exposure control apparatus comprises a timing circuit which effects a delayed operation of the trigger switch in response to the selection of a particular photographing mode, such as a daytime synchronized photographing operation.

7 Claims, 4 Drawing Figures

F I G. 2

| PHOTOGRAPHING MODE | (I) | (II) | (III) |
|---|---|---|---|
| CHARGING COMPLETE SIGNAL (CHARGING CONDITION) | LOW (OFF/UNCHARGED) | HIGH (CHARGED) | HIGH (CHARGED) |
| MODE SELECTION SWITCH 35 | OFF (OPEN) | OFF (OPEN) | ON (CLOSE) |
| OUTPUT OF AND 37 | LOW | LOW | HIGH |
| TIME CONSTANT (R29+C30) | INEFFECTIVE | INEFFECTIVE | EFFECTIVE |
| PHOTOGRAPHING OPERATION | UNDER NATURAL LIGHT ILLUMINATION | UNDER COMBINED ILLUMINATION OF FLASHLIGHT AND NATURAL LIGHT | PREDOMINANTLY BASED ON FLASHLIGHT |

EXPOSURE CONTROL APPARATUS FOR USE WITH A CAMERA HAVING ELECTRONIC FLASH CONTROLLING CAPABILITY

BACKGROUND OF THE INVENTION

The invention relates to an exposure control apparatus for use with a camera having electronic flash controlling capability, and more particularly, to an exposure control system which permits an exposure control to be exercised predominantly based on flashlight from an electronic flash in a daytime synchronized photographing operation in which an object being photographed is illuminated by both natural light and flashlight from an electronic flash.

When taking a picture of an object such as a person standing in a background such as a bright landscape or illumination, a picture is taken of the rear light. Hence, the exposure level will be determined by the bright illumination of the background, resulting in an underexposure. To prevent an underexposure of the object being photographed, it may be illuminated by flashlight from an electronic flash. Taking a picture in a bright illumination by using flashlight from an electronic flash is commonly known as a daytime synchronized photographing operation.

In a photographing operation utilizing a synchronized operation of an electronic flash, the flash is activated to cause a flashlight discharge at the time when the shutter of the camera is fully open. For this reason, an exposure period usable with such camera is generally established on the order of 1/60 second, a relatively slow shutter operation. When the shutter is fully open, the flash is activated in synchronized relationship therewith.

On the other hand, with a camera capable of an automatic exposure control, an exposure control apparatus contained therein is operable to effect photometry of light reflected from an object being photographed to determine a proper exposure period in an automatic manner in order to close the shutter, in any mode of the camera including normal photographing, a photographing operation under the flashlight illumination from an electronic flash and a daytime synchronized photographing operation. However, it will be noted that during the daytime synchronized photographing operation, the electronic flash is activated at the time the shutter is fully open, so that the exposure control apparatus will have been effecting photometry of light from the object under the natural illumination until the flash is activated to produce flashlight, for example, for a time interval of 1/60 second, followed by photometry of light reflected from the object which is now illuminated by the flashlight. In certain circumstances, it is desirable that a picture of the object be taken by an exposure control which is predominantly based on the flashlight from the electronic flash, eliminating the influence of natural light. However, such elimination has been impossible with the prior art arrangement.

SUMMARY OF THE INVENTION

In view of the foregoing, it is an object of the invention to provide an exposure control apparatus for use with a camera having electronic flash controlling capability which includes a timing circuit to delay the operation of a trigger switch which triggers a photometric circuit during a selected photographing mode such as a daytime synchronized photographing operation in order to permit an exposure control predominantly based on the flashlight from an electronic flash.

In accordance with the invention, the timing circuit which operates the trigger switch causes the activation of the trigger switch and hence the photometric circuit of the photometric circuit to be delayed, thereby eliminating the influence of natural light on the photometry and permitting an exposure control predominantly based on the flashlight from an electronic flash.

In addition to enabling an exposure control which permits a photographing operation to be predominantly based on the flashlight from an electronic flash in the manner mentioned above in response to a mode selection switch which selects particular photographing mode, the invention also enables an exposure control under natural light illumination as well as an exposure control of illumination comprising both natural light and flashlight from an electronic flash, in a selective manner, thus extending the selectable modes of operation.

BRIEF DESCRIPTION OF THE DRAWINGS

FIG. 2 shows a table illustrating the operation of the electrical circuit shown in FIG. 1.

DESCRIPTION OF THE PREFERRED EMBODIMENT

Figure 1:
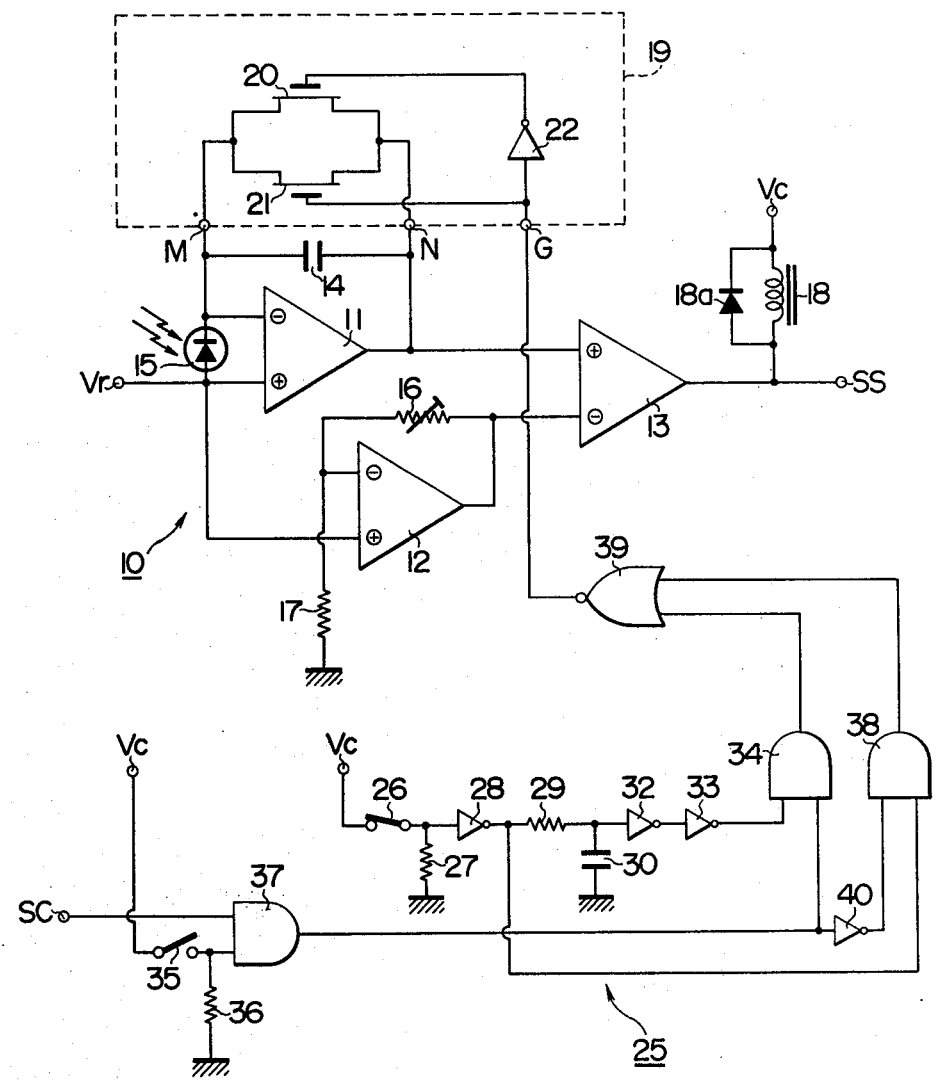
FIG. 1 is a circuit diagram of an exposure control apparatus for use with a camera having electronic flash controlling capability which is constructed in accordance with one embodiment of the invention.

Referring to FIG. 1, there is shown an electrical circuit of the exposure control apparatus according to the invention which includes a photometric circuit 10 and a timing circuit 25 which operates a trigger switch.

The photometric circuit 10 includes a photometric, photoelectric transducer element in the form of a silicon photodiode 15 which is effective to determine light reflected from an object being photographed. The photometric circuit additionally includes an integrating capacitor 14, a first, a second and a third operational amplifier 11, 12 and 13, a trigger switch 19 which is formed by a CMOS analog switch, an electromagnet 18 which controls the closing operation of a shutter, a protective diode 18a associated with the electromagnet, a semi-fixed resistor 16 and another resistor 17. The photodiode 15 has its cathode connected to the inverting input of the first operational amplifier 11 and its anode connected to the non-inverting input thereof. The integrating capacitor 14 is connected between the inverting input and the output of the first operational amplifier 11, and the trigger switch 19 includes connection terminals M and N which are connected across the capacitor 14. The non-inverting input of the first operational amplifier 11 and the non-inverting input of the second operational amplifier 12 are interconnected and are supplied with a reference voltage Vr. The output of the first amplifier 11 is connected to the non-inverting input of the third operational amplifier 13. The inverting input of the second operational amplifier 12 is connected to one end of the semi-fixed resistor 16 and the resistor 17. The other end of the resistor 17 is connected to the ground while the other end of the semi-fixed resistor 16 is connected to the output of the second amplifier 12 and to the inverting input of the third operational amplifier 13. The output of the third amplifier 13 is connected to one end of the electromagnet 18, which is shunted by the diode 18a. The output of the amplifier 13 is also connected to an electronic flash controlling terminal SS to supply an electronic flash controlling signal thereto. The other end of the electromagnet 18 is connected to a supply voltage Vc.

The trigger switch 19 comprises a CMOS transistor structure including PMOS transistor 20 and NMOS transistor 21 connected in parallel with each other. To turn the both transistors 20, 21 on and off, the gate of NMOS transistor 21 is directly connected to a control terminal G while the gate of PMOS transistor 20 is connected to the output of an inverter 22, the input of which is connected to the control terminal G. The parallel connected transistors 20, 21 have their sources and drains connected to the terminals M and N, respectively, to render the path across the terminals M, N conductive or non-conductive in response to the high or the low level of the control signal applied to the control terminal G which turn the transistors 20, 21 on or off, respectively.

The purpose of the integrating capacitor 14 is to form an integrated voltage representing the integral of a photocurrent through the photodiode 15. The integrated voltage is produced at the output of the first operational amplifier 11, and is applied to the non-inverting input of the third operational amplifier 13, which forms a comparator.

The purpose of the second operational amplifier 12 is to produce a reference voltage against which the comparison by the third amplifier 13 takes place. A reference voltage is established which depends on a film speed by utilizing the semi-fixed resistor 16. As shown, the reference voltage or the output of the second amplifier 12 is applied to the inverting input of the third operational amplifier 13.

The electromagnet 18 is normally energized to prevent the shutter from closing. However, when the output voltage from the first amplifier 11 exceeds the reference voltage supplied by the second amplifier 12 to cause the third amplifier 13 to produce an output voltage of a high level, indicating that a proper exposure period has passed, the electromagnet 18 is deenergized to permit the shutter to close. It will be seen that any counter-electromotive force developed by the electromagnet 18 will be bypassed through the diode 18a to prevent any damage to the third amplifier 13.

The timing circuit 25 functions to control the timing to operate the trigger switch 19 in the photometric circuit 10. It comprises a mode selection switch 35 which is used to select a particular photographing mode of the camera, a normally closed release switch 26 which is opened in response to a shutter release operation of the camera, inverters 28, 32, 33 and 40, AND circuits 34, 37 and 38, NOR circuit 39, resistors 27, 29 and 36, and capacitor 30.

AND circuit 37 has its one input connected to a terminal SC which is connected with an electronic flash to receive a charging complete signal therefrom. The charging complete signal assumes a high level upon completion of a charging operation within the electronic flash, which is ready to produce flashlight. The signal is at its low level whenever it is incapable of producing flashlight as a result of an incomplete charging operation or when the electronic flash is turned off.

The mode selection switch 35 has its one end connected to a supply voltage Vc and its other end to the other input of AND circuit 37 and also to one end of the resistor 36, the other end of which is connected to the ground.

The release switch 26 is opened in response to a shutter release operation to activate the electrical circuit of the exposure control apparatus shown in FIG. 1. Its one end is connected to the supply voltage Vc and its other end connected to the input of the inverter 28 and to one end of resistor 27, the other end of which is connected to the ground.

The output of the inverter 28 is connected to one input of AND circuit 38 and also to one end of resistor 29, the other end of which is connected to the input of inverter 32 and also to one end of capacitor 30, the other end of which is connected to the ground. The output of inverter 32 is connected to the input of another inverter 33, the output of which is connected to one input of AND circuit 34. The output of AND circuit 37 is connected to the other input of AND circuit 34 and also to the input of inverter 40, the output of which is fed to the other input of AND circuit 38. As shown, the outputs of AND circuits 34, 38 are fed to both inputs of NOR circuit 39, the output of which is connected to the control terminal G of the trigger switch 19 in the photometric circuit 10.

Having described the construction of the exposure control circuit of FIG. 1, its operation will now be described with reference to FIGS. 2 to 4.

It is to be understood that the exposure control circuit shown in FIG. 1 is capable of assuming either one of the three photographing modes indicated in the table of FIG. 2. Specifically, photographing mode I represents a photographing operation under natural light, mode II a photographing operation under the combined illumination of natural light and flashlight from an electronic flash, and mode III a photographing operation predominantly based on the flashlight from an electronic flash. As indicated in the table, these modes are selected by a combination of a charging complete signal and the position of mode selection switch 35.

It will be understood that during mode I, no flashlight from an electronic flash is utilized. Referring to FIG. 3 which illustrates the operation of the circuit during the mode II, the photometry is initiated at time $t_1$ in response to a shutter release operation, and the shutter becomes fully open at time $t_3$ whereupon synchro contacts associated with the electronic flash are closed to activate it for producing flashlight. It will be seen that during a time interval from $t_1$ to $t_3$, the object being photographed is principally illuminated by natural light while after time $t_3$, it is predominantly illuminated by flashlight from the electronic flash, even though there is a certain contribution of natural light. Referring to FIG. 4 which illustrates the operation of the circuit during the mode III, the exposure control apparatus associated with the camera is not operated at time $t_1$ when the shutter is opened to initiate a photometric operation. Rather, it is operated at time $t_2$ which is immediately before time $t_3$ when the electronic flash operates to produce flashlight. During the time interval from $t_2$ to $t_3$, the exposure control is based on the natural light while after time $t_3$, it is predominantly based on the flashlight from the electronic flash.

Figure 3:
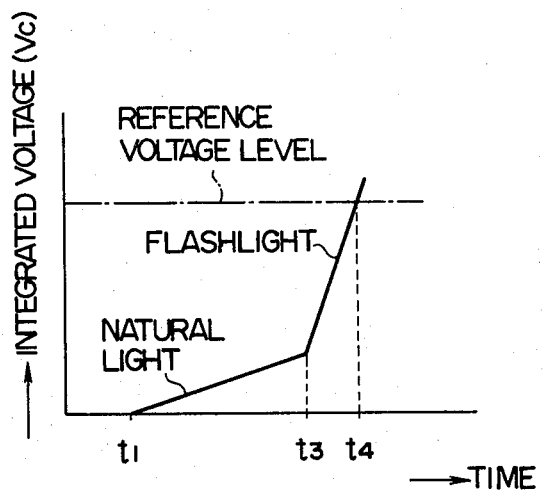
FIGS. 3 and 4 graphically illustrate variations of an integrated voltage formed by the circuit of FIG. 1.
Figure 4:
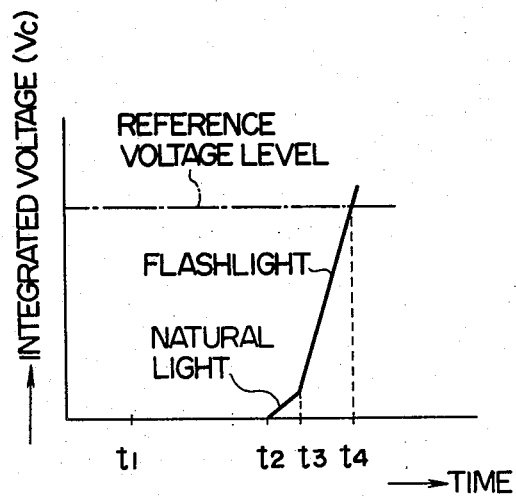

From the above description, it will be evident that there is a difference in the time when the exposure control apparatus begins to operate, between the modes II and III, as illustrated by FIGS. 3 and 4, the apparatus beginning to operate at time $t_1$ during the mode II and at time $t_2$ during the mode III. A time difference of $t_2-t_1$ is produced by a time constant circuit which is formed by the resistor 29 and the capacitor 30 shown in the circuit of FIG. 1.

Considering the photographing mode I more specifically, the charging complete signal is off and the terminal SC is at its low level while the mode selection switch 35 assumes its off or open position, as indicated by the table of FIG. 2. Consequently, AND circuit 37 produces a low output level which disables AND circuit 34. Hence, a timing output from the time constant circuit defined by the resistor 29 and the capacitor 30 cannot be gated through AND gate 34. The output of AND gate 37 is inverted by the inverter 40 to enable AND gate 38. When a shutter release operation takes place under this condition, the release switch 26 shown in FIG. 1 is opened to drive the exposure control circuit. Specifically, when the release switch 26 is opened, the output of the inverter 28 assumes a high level, which is applied to the other input of AND circuit 38, which therefore produces a high level output to feed NOR circuit 39. As a result, the output of NOR circuit 39 changes from a high to a low level. This output is applied to the control terminal G of the trigger switch 19. When the signal applied to the control terminal G is a high level, the transistors 20, 21 are turned on to maintain the integrating capacitor 14 short-circuited. However, when the output from NOR circuit 39 changes to its low level, the both transistors 20, 21 are turned off, and hence the integrating capacitor 14 is no longer short-circuited and becomes able to be charged by the photocurrent of the photodiode 15.

Concurrently with the shutter release operation, the photodiode 15 initiates the photometry of light reflected from the object being photographed which is illuminated by natural light, thus producing a photocurrent output. This photocurrent charges the integrating capacitor 14 to provide an integrated voltage Vc at the output of the first operational amplifier 11 which is applied to the non-inverting input of the third operational amplifier 13. The third amplifier 13 compares it against the reference voltage developed at the output of the second operational amplifier 12 which is applied to the inverting input of the third amplifier 13. When the integrated voltage exceeds the reference voltage, the output from the third amplifier changes to a high level, deenergizing the electromagnet 18 to permit the shutter to be closed. In this manner, a normal photographing operation under natural light is terminated as a consequence of an automatic exposure control.

During the photographing mode II, the charging complete signal assumes a high level and the mode selection switch 35 is turned off, as indicated by the table of FIG. 2. At this time, AND circuit 37 produces a low level output to disable the time constant circuit as before while it enables AND circuit 38. The difference from the photographing mode I is that the electronic flash has completed its charging operation and is capable of producing flashlight.

As a shutter button of the camera is depressed to release the shutter under this condition, the release switch 26 opens, whereby the inverter 28 produces a high level output which is gated through AND gate 38 to cause NOR circuit 39 to produce a low level output. Consequently, the transistors 20, 21 of the trigger switch 19 are turned off, whereby the integrating capacitor 14 is no longer short-circuited. The photometry by the photodiode 15 is initiated, and the first amplifier 11 produces an integrated voltage Vc. Referring to FIG. 3, it will be seen that during the time interval from $t_1$ to $t_3$, the voltage Vc represents an integral of a photocurrent resulting from the natural light. As the electronic flash produces flashlight when the shutter is fully open at time $t_3$ to activate the electronic flash, the integrated voltage Vc sharply rises in proportion to the increased amount of light, as shown, and exceeds the reference voltage at time $t_4$, whereupon the output of the third operational amplifier 13 changes to a high level, deenergizing the electromagnet 18 to permit the shutter to be closed to terminate a photographing operation. When the output of the amplifier 13 changes to a high level, the resulting signal is supplied through the terminal SS to the electronic flash, interrupting its operation. As described, during the photographing mode II, photometry is made of light reflected from the object being photographed which is illuminated by the natural light during a time interval from time $t_1$ when the shutter is released to time $t_3$ when the shutter is fully open to activate the electronic flash, while after time $t_3$, the photometry is made of light reflected from the object which is illuminated by the combination of the natural light and the flashlight from the electronic flash.

During the photographic mode III, the charging complete signal assumes a high level and the mode selection switch 35 is turned on or closed, as indicated in the table of FIG. 2. The output of AND circuit 37 now assumes a high level, which is inverted by the inverter 40 to disable AND gate 38 and enable AND gate 34. Consequently, a timing signal developed by the combination of the resistor 29 and the capacitor 30 and applied to the other input of AND circuit 34 through the pair of inverters 32, 33 becomes effective.

If the shutter button of the camera is now depressed, the release switch 26 opens, whereby the inverter 28 produces a high level output which charges the capacitor 30 through the resistor 29. After a time delay determined by the time constants of the resistor 29 and the capacitor 30, the voltage across the capacitor 30 exceeds a threshold voltage of the inverter 32, causing the latter to produce a low level output. The inverter 33 in turn produces a high level output. Hence, the high level output is fed to NOR circuit 39 to render its output into a low level, thus turning the trigger switch 19 off. Accordingly, the integrating capacitor 14 is no longer short-circuited, and becomes charged by the photocurrent through the diode 15 from such time on. The first amplifier 11 produces an integrated voltage Vc. Referring to FIG. 4, it will be noted that while the shutter is released at time $t_1$, the photometric circuit 10 is incapable of immediately initiating its photometric operation until time $t_2$ by the action of the timing circuit formed by the resistor 29 and the capacitor 30 and is able to initiate the photometric operation at time $t_2$.

In the present example, the time $t_2$ is chosen to be located immediately before time $t_3$ when the shutter is fully open to activate the electronic flash. The time difference of $t_2-t_1$ is determined by the combination of the resistor 29 and the capacitor 30.

At time $t_2$, the photodiode 15 produces a photocurrent proportional to light reflected by the object being photographed which is illuminated by natural light, and the first amplifier 11 produces an integrated voltage Vc. Subsequently, at time $t_3$, the electronic flash is activated, and the flashlight therefrom is added to illuminate the object, the reflection of which is determined by the photometric circuit. Hence, the integrated voltage Vc produced by the amplifier 11 sharply rises as shown in FIG. 4, exceeding the reference voltage at time $t_4$, whereupon the third amplifier 13 produces a high level output to deenergize the electromagnet 18 to permit the shutter to be closed, thus terminating a photographing operation. When the output of the third amplifier 13 changes to a high level, the resulting signal is transmitted through the terminal SS to the electronic flash, interrupting its operation.

It will be understood from the foregoing description that during the photographing mode III, no photometry is made of light reflected from the object being photographed which is illuminated by natural light during a time interval from time $t_1$ when the shutter is released to time $t_2$ which is immediately before the electronic flash is activated. After time $t_3$, the photometry is made of light reflected from the object which is illuminated by the combination of the natural light and the flashlight from the electronic flash. In the described embodiment, photometry is made of the object illuminated by the natural light during a time interval from $t_2$ to $t_3$. It will be appreciated that this time interval may be reduced to zero, completely eliminating the photometry of light reflected from the object which is illuminated by the natural light. However, the time constant determined by the combination of the resistor 29 and the capacitor 30 has a certain degree of variation. In other words, there is a difficulty in bringing the time $t_2$ when the photometric circuit is enabled into coincidence with time $t_3$. Hence, in the embodiment described above, the time $t_2$ is chosen to be slightly earlier than time $t_3$, thus preventing the photometric circuit from being enabled at a time later than time $t_3$ for any variation of the timing constants.

From the foregoing description, it will be appreciated that the invention has enabled an exposure control which is predominantly based on the flashlight from an electronic flash during a daytime synchronized photographing operation, by eliminating the influence of an exposure control responsive to natural light. The combination of the mode selection switch 35 and a condition of the electronic flash permits any desired photographing mode to be chosen. The apparatus of the invention also enables taking pictures under natural light alone or under the combined illumination of natural light and the flashlight from an electronic flash. Thus, normal facilities are maintained.

What is claimed is:

1. An exposure control apparatus for use with a camera, wherein the camera includes a shutter that releases and closes and wherein the camera has the capability of controlling an electronic flash, the exposure control apparatus includes a photometric circuit which effects photometry of light reflected from an object being photographed to determine an exposure period automatically, the photometric circuit being connected for operating the shutter to close upon completion of the exposure period, and the exposure control apparatus further includes a trigger switch which is operated in response to a shutter release to begin operation of the photometric circuit; the exposure control apparatus comprising: a timing circuit which is operable to increase by a predetermined amount a time period from the beginning of the shutter release of the camera to the actuation of the trigger switch to initiate photometry, said timing circuit comprising a mode selection switch for selecting a photographing mode, and a circuit for receiving a charging complete signal that indicates that the electronic flash is capable of being discharged, said mode selection switch and said charging complete signal receiving circuit cooperating to operate said exposure control apparatus in one of a plurality of predetermined operating modes, said operating modes corresponding to respective photographing modes of the camera and said one operating mode corresponding to the selected photographing mode.

2. An exposure control apparatus according to claim 1 in which said apparatus has operating modes corresponding respectively to three photographic modes, the three photographing modes including a first photographing mode wherein an exposure period is determined by photometry of light reflected from an object which is being photographed and which is illuminated by natural light, a second photographing mode wherein an exposure period is determined by photometry of light reflected from an object which is being photographed and which is illuminated by the combination of natural light and flashlight from an electrical flash, and a third photographing made in which an exposure period is determined by photometry of light reflected from an object which is being photographed and which is predominantly illuminated by flashlight from an electronic flash.

3. An exposure control apparatus according to claim 1 in which said timing circuit includes a release switch which is operable in response to a shutter release operation of the camera, said timing circuit starting its operation in response to the operation of said release switch.

4. An exposure control apparatus according to claim 1 in which said timing circuit includes a time constant circuit which delays the commencement of the photometry when said trigger switch is operated.

5. An exposure control apparatus according to claim 4 in which the time delay by said time constant circuit is chosen to be substantially equal to the difference between the time when the shutter of the camera is fully open to activate the electronic flash and the time when the shutter is released.

6. An exposure control apparatus according to claim 4 in which said time constant circuit comprises resistor means and a capacitor means.

7. An exposure control apparatus according to claim 1 in which said timing circuit comprises:
   a release switch which is operable in response to an operation of the shutter release of the camera to generate an output signal;
   a time constant circuit for storing said output signal generated by said release switch for a predetermined delay period and for reemitting said stored signal after said delay period; and
   a gate circuit responsive to said output signal for applying an additional signal to said trigger switch to operate said trigger switch, said gate circuit being for applying said additional signal to said trigger switch either after a time delay determined by said time constant circuit or without a time delay, as a function of the choice of photographing mode.

* * * * *